US012586796B2

(12) United States Patent (10) Patent No.: US 12,586,796 B2
Shimizu et al. (45) Date of Patent: Mar. 24, 2026

(54) CATALYST FOR FUEL CELL

(71) Applicants:TOYOTA JIDOSHA KABUSHIKI KAISHA, Toyota (JP); CATALER CORPORATION, Kakegawa (JP)

(72) Inventors: Ryo Shimizu, Susono (JP); Akihiro Hori, Fukuroi (JP); Mikihiro Kataoka, Fukuroi (JP); Kenji Yamamoto, Hamamatsu (JP); Michihisa Umezawa, Fukuroi (JP)

(73) Assignees: TOYOTA JIDOSHA KABUSHIKI KAISHA, Toyota (JP); CATALER CORPORATION, Kakegawa (JP)

( * ) Notice: Subject to any disclaimer, the term of this patent is extended or adjusted under 35 U.S.C. 154(b) by 517 days.

(21) Appl. No.: 18/180,911

(22) Filed: Mar. 9, 2023

(65) Prior Publication Data

US 2023/0352699 A1 Nov. 2, 2023

(30) Foreign Application Priority Data

Apr. 28, 2022 (JP) ................................. 2022-073929

(51) Int. Cl.
*H01M 4/92* (2006.01)
(52) U.S. Cl.
CPC ................................. *H01M 4/926* (2013.01)

(58) Field of Classification Search
CPC ... B01J 21/18; B01J 23/42; B01J 35/33; B01J 35/615; B01J 35/66; H01M 4/92
USPC .......................................... 429/524; 502/185
See application file for complete search history.

(56) References Cited

U.S. PATENT DOCUMENTS

2008/0113859 A1 * 5/2008 Popov .................. B01J 37/0207
502/353

FOREIGN PATENT DOCUMENTS

| | | | | | | |
|----|----|----|---|--------|--------|-----------|
| EP | 1309024 | A2 | * | 5/2003 | ............... | C25B 9/23 |
| EP | 4517886 | A1 | * | 3/2025 | ............... | C09C 1/50 |
| JP | 4315857 | B2 | * | 8/2009 | ............. | B01D 53/94 |
| JP | 2014-534052 | A | | 12/2014 | | |
| JP | 6124899 | B2 | | 5/2017 | | |
| WO | 2013/045894 | A1 | | 4/2013 | | |
| WO | WO-2015177542 | A1 | * | 11/2015 | .......... | H01M 8/1004 |
| WO | WO-2023105204 | A1 | * | 6/2023 | ............. | H01M 4/925 |

* cited by examiner

*Primary Examiner* — Patricia L. Hailey
(74) *Attorney, Agent, or Firm* — Dickinson Wright, PLLC

(57) ABSTRACT

A catalyst for a fuel cell includes a carbon support including a micropore, and a metal supported on the carbon support. The metal is at least one of platinum and a platinum alloy, a specific surface area of the carbon support is 250 m²/g-carbon or more and 338 m²/g-carbon or less, and an area of the micropore of the carbon support is 48 m²/g-carbon or more and 74 m²/g-carbon or less.

7 Claims, 2 Drawing Sheets

CATALYST FOR FUEL CELL

CROSS-REFERENCE TO RELATED APPLICATION

This application claims priority to Japanese Patent Application No. 2022-073929 filed on Apr. 28, 2022, incorporated herein by reference in its entirety.

BACKGROUND

1. Technical Field

The present disclosure relates to a catalyst for a fuel cell.

2. Description of Related Art

Various studies are being made relating to catalysts for fuel cells. For example, Japanese Unexamined Patent Application Publication (Translation of PCT Application) No. 2014-534052 (JP 2014-534052 A) discloses a catalyst including a carbon support material having (a) a specific surface area (BET) of 100 m²/g to 600 m²/g, and (b) a micropore area of 10 m²/g to 90 m²/g.

SUMMARY

There is demand for further improvement in durability of catalysts for fuel cells, in preparation for practical application of commercial vehicles equipped with fuel cells.

The present disclosure has been made in view of the above circumstances, and provides a catalyst for a fuel cell in which durability can be improved and deterioration of catalyst performance can be suppressed.

The catalyst according to the present disclosure is a catalyst for a fuel cell, the catalyst including a carbon support including a micropore and a metal supported on the carbon support. The metal is at least one of platinum and a platinum alloy, a specific surface area of the carbon support is 250 m²/g-carbon or more and 338 m²/g-carbon or less, and an area of the micropore of the carbon support is 48 m²/g-carbon or more and 74 m²/g-carbon or less.

According to the present disclosure, durability of the catalyst for a fuel cell can be improved while also suppressing deterioration in catalyst performance.

In the catalyst according to the present disclosure, the carbon support may be acetylene black.

In the catalyst according to the present disclosure, a gas diffusion limiting current value observed by I-V measurement of the fuel cell may be 0.15 A/cm² or higher.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
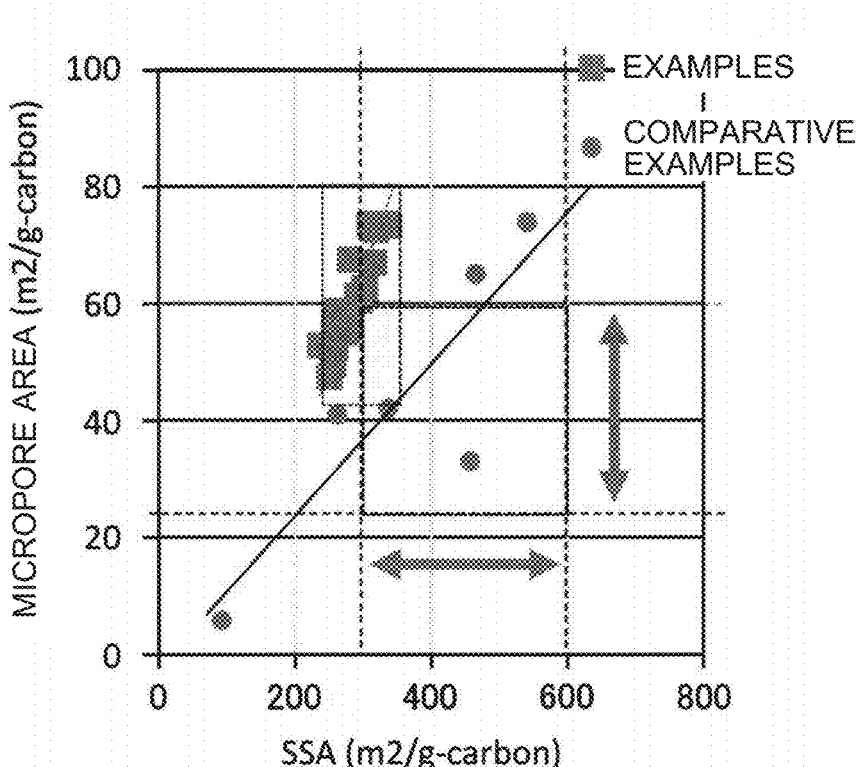
FIG. 1 is a diagram showing a relation between specific surface area (SSA) and micropore area of carbon supports used in Examples and Comparative Examples.

Embodiments according to the present disclosure will be described below. Note that matters other than those stated in particular in the present specification but necessary to carry out the present disclosure (e.g., general configurations and manufacturing processes of catalysts for fuel cells and so forth, which are not features of the present disclosure) can be understood to be matters of design of those skilled in the art based on the related art in this field. The present disclosure can be carried out based on the content disclosed in the present specification and common general technical knowledge in this field. Also, dimensional relations (length, width, thickness, etc.) in the drawings do not reflect actual dimensional relations. In the present specification, the term "to" used to indicate a numerical range is used in the sense of including the numerical values described before and thereafter as a lower limit value and an upper limit value. Also, any combination of upper limit and lower limit in the numerical ranges can be adopted.

Catalyst for Fuel Cell

The catalyst according to the present disclosure is a catalyst for a fuel cell, the catalyst including a carbon support including a micropore and a metal supported on the carbon support. The metal is at least one of platinum and a platinum alloy, a specific surface area of the carbon support is 250 m²/g-carbon or more and 338 m²/g-carbon or less, and an area of the micropore of the carbon support is 48 m²/g-carbon or more and 74 m²/g-carbon or less.

High durability is the primary requirement for catalysts for commercial vehicles equipped with fuel cells, which are expected to be driven over long distances. In addition, reduction in size of a fuel cell stack is essential from the viewpoint of the range of carrying capacity, while at the same time high performance of the catalyst is also demanded. In the related art, realization of both performance and durability of the catalyst has been difficult, due to these being in a conflicting relation. This is because catalyst durability and catalyst performance are correlated with the specific surface area of the carbon support. Reduction of the specific surface area is necessary in order to improve durability, and increasing the specific surface area is necessary in order to improve catalyst performance, and accordingly, these are in a trade-off relation. The present researchers have found that by reducing the specific surface area of the carbon support, which is a factor in reducing durability, within a predetermined range, the desired durability can be ensured while the desired catalyst performance of the catalyst is ensured by increasing the area of micropores of the carbon support within a predetermined range. Therefore, according to the present disclosure, controlling the specific surface area of the carbon support and the area of the micropores to within predetermined ranges enables the durability of the catalyst to be improved, and also deterioration of catalyst performance to be suppressed. This is because reducing the specific surface area reduces the degradation point of the carbon support, while increasing the micropore area secures diffusion paths for gas and reduces material transport overvoltage that leads to loss in catalyst performance.

The catalyst according to the present disclosure includes a carbon support and a metal that is supported on the carbon support. In the catalyst according to the present disclosure, a gas diffusion limiting current value observed by I-V measurement of the fuel cell may be 0.15 A/cm² or higher. This enables the catalyst to have desired durability, while also ensuring catalyst performance equal to or greater than that of conventional high-specific-surface-area items. In the present disclosure, the gas diffusion limiting current value is an average value of the observed current between 0.1 V to 0.6 V in I-V measurement under predetermined conditions (cell temperature of 45° C., relative humidity at both electrodes of 165%) in a low current density region.

The metal is supported on the carbon support. The metal is at least one of platinum and a platinum alloy. The platinum alloy may be an alloy containing platinum, and one type, or two or more types, of metal selected from a group consisting of cobalt, nickel, iron, manganese, copper, titanium, tungsten, tin, gallium, zirconium, chromium, gadolinium, terbium, ytterbium, hafnium, and osnium. Among these, platinum, a platinum-cobalt alloy, a platinum-nickel alloy, and so forth may be used, and in particular, a platinum-cobalt alloy may be used. The metal may be metal particles that are particulate in form. The particle size of the metal particles is not limited in particular, but may be 1 nm or more and 10 nm or less. The particle size of metal particles can be measured using a 3D transmission electron microscope (TEM) system or the like.

The carbon support supports the metal. The carbon support has micropores. It is sufficient for the average pore size of the micropores to be less than 2 nm. The average pore size of the micropores is found by measuring the pore sizes of a plurality of randomly selected micropores, and calculating the average value thereof. The average pore size can be measured using a 3D-TEM system or the like. The carbon support may be a porous substance. The carbon support may be carbon support particles that are particulate in form. The particle size of the carbon support particles is not limited in particular, as long as the particle size is larger than the pore size of the micropores, and may be, for example, 2 nm or more and 100 nm or less. The particle size of carbon support particles can be measured using a 3D-TEM system or the like.

The carbon support has a specific surface area of 250 m²/g-carbon or more and 338 m²/g-carbon or less. The durability of the catalyst can be improved by suppressing the specific surface area to within this range. The specific surface area is measured by the Brunauer-Emmett-Teller (BET) method. Measurement of the specific surface area by the BET method is performed by the following process. After degassing the carbon support to form a clean solid surface, a nitrogen adsorption isotherm is obtained, and the amount of gas adsorbed is measured as a function of gas pressure at a constant temperature (typically, the temperature of liquid nitrogen at the boiling point thereof at one atmosphere). Next, with regard to $P/P_0$ values in the range of 0.05 to 0.3 (or sometimes as low as 0.2), $1/[V_a((P_0/P)-1)]$ vs $P/P_0$ (in which expression $V_a$ is the amount of gas adsorbed at pressure P, and $P_0$ is the saturation pressure of the gas) is plotted. The plot is fitted with a straight line to obtain the monomolecular layer volume $(V_m)$ from intercept $1/V_mC$ and slope $(C-1)/V_mC$ (where C is a constant in the expression). Surface area of the sample can be determined from the monomolecular layer volume by correcting for the area occupied by a single adsorbate molecule.

The area of micropores of the carbon support is 48 m²/g-carbon or more and 74 m²/g-carbon or less. The desired performance of the catalyst can be ensured by securing the area of the micropores in this range. Area of a micropore refers to the surface area associated with the micropore, in which a micropore is defined as a pore with an internal width of less than 2 nm. The micropore area is determined by use of a t-plot generated from the nitrogen adsorption isotherm as described above. The t-plot has the volume of gas adsorbed plotted as a function of standard multilayer thickness t, in which the t-value is calculated using a pressure value from the adsorption isotherm in a thickness expression, in this case the Harkins-Jura expression. The slope of a linear portion of the t-plot at thickness values between 0.35 nm and 0.5 nm is used to calculate external surface area, i.e., surface area associated with all pores except micropores. Next, micropore surface area is calculated by subtracting the external surface area from the BET surface area.

The carbon support may be an electroconductive carbon support having electroconductivity. Electroconductive carbon supports can be obtained by functionalization of existing carbon materials. Functionalization or activation of carbon is understood as being, in a case of physical activation, post-treatment of the carbon by gases such as oxygen, air, carbon dioxide, steam, ozone, nitrogen oxide, or the like, and in a case of chemical activation, as reaction of carbon precursors with solid or liquid reagents such as potassium hydroxide (KOH), zinc chloride ($ZnCl_2$), phosphoric acid ($H_3PO_4$), or the like, at a high temperature. During the activation process, part of the carbon is lost through chemical reactions or combustion. Activation of carbon supports is typically performed using an oxidizing gas such as oxygen, ozone, hydrogen peroxide, nitrogen dioxide, or the like, which results in an increase in the specific surface area, and also an increase in the amount of surface radicals. Activation can also be performed by air, carbon dioxide, or steam treatment. The carbon support may be acetylene black. The acetylene black may be air-activated acetylene black that has been activated by air.

Also, in an accelerated test including 1.2 V potential holding at 80° C. over 24 hours, the carbon support may have a loss amount (absolute corrosion amount in units of wt %) of less than 9.1%, further 8.0% or less, or even further 7.9% or less. Carbon loss can be determined by the following test, which is generally accepted. Selected catalyst or carbon electrodes are held at 1.2 V (vs. reversible hydrogen electrode (RHE)) at 80° C. in 1 M $H_2SO_4$ liquid electrolytic solution, and the corrosion current is monitored over 24 hours. The charge passed during the experiment is integrated and used to calculate removed carbon, assuming a four-electron process of converting the carbon to $CO_2$ gas. The first minute of the test is not included, since the charge that passes through during this period is due to charging of the electrochemical double layer, and accordingly not due to corrosion processes. The mass of carbon lost during the 24-hour test is expressed as a percentage of the original carbon content of the electrode.

The specific corrosion rate of the carbon support may be less than 56%, further less than 34%, and even further not more than 31%. The specific corrosion rate is determined by expressing the amount of carbon corroded as a percentage of the number of surface carbon atoms. The maximum charge required to remove one monomolecular layer of carbon is determined, assuming $3.79×10^{19}$ atoms m⁻² of carbon, and a four-electron process. The experimentally-determined charge associated with carbon corrosion is expressed as a percentage of the monomolecular layer, to yield the specific corrosion rate.

The catalyst according to the present disclosure is for a fuel cell. Examples of types of fuel cells include polymer electrolyte fuel cells (PEFC), phosphoric acid fuel cells (PAFC), molten carbonate fuel cells (MCFC), solid oxide fuel cells (SOFC), alkaline electrolyte fuel cells (AFC), a direct-ethanol fuel cell (DFC), and so forth, and in particular, a polymer electrolyte fuel cell may be used. The fuel cell may have only a single cell, or may be a fuel cell stack that is a stack of multiple single cells. The number of stacked single cells is not limited in particular, and may be, for example, two to several hundred.

The single cell of the fuel cell includes at least a membrane electrode gas diffusion layer assembly. The membrane electrode gas diffusion layer assembly has an anode-side gas diffusion layer, an anode catalyst layer, an electrolyte membrane, a cathode catalyst layer, and a cathode-side gas diffusion layer, in this order.

The cathode (oxidant electrode) includes the cathode catalyst layer and, when necessary, the cathode-side gas diffusion layer. The anode (fuel electrode) includes the anode catalyst layer and, when necessary, the anode-side gas diffusion layer. The cathode catalyst layer and the anode catalyst layer will be collectively referred to as "catalyst layers". The catalyst layers contain the catalyst for a fuel cell described above, and typically further contain an electrolyte. The electrolyte may have proton conductivity, and may be a fluororesin or the like. A perfluorosulfonic acid-based resin or the like, such as Nafion (registered trademark) or the like, may be used as the fluororesin, for example.

The cathode-side gas diffusion layer and the anode-side gas diffusion layer will be collectively referred to as "gas diffusion layers". The gas diffusion layer may be an electroconductive member having gas permeability, or the like. Examples of the electroconductive member include a carbon porous body such as carbon cloth, carbon paper, or the like, and a metal porous body such as a metal mesh, a foamed metal, or the like.

The electrolyte membrane may be a solid polymer electrolyte membrane. Examples of the solid polymer electrolyte membrane include a fluorine-based electrolyte membrane such as a thin film of perfluorosulfonic acid containing moisture, and a hydrocarbon-based electrolyte membrane. Examples of the electrolyte membrane may include a Nafion membrane (manufactured by DuPont), and so forth.

The single cell may include two separators that sandwich both sides of the membrane electrode gas diffusion layer assembly as necessary. One of the two separators is an anode-side separator and the other is a cathode-side separator. In the present disclosure, the anode-side separator and the cathode-side separator will be collectively referred to as "separators". The separators may have ports that are a supply port, a discharge port, and the like, through which a reactant gas, a coolant, and so forth flow, in a stacking direction of the single cell. Examples of the coolant include a mixed solution of ethylene glycol and water, to suppress freezing at low temperatures. In the present disclosure, fuel gas and oxidant gas will be collectively referred to as "reactant gases". The reactant gas supplied to the anode is fuel gas, and the reactant gas supplied to the cathode is oxidant gas. The fuel gas is a gas that primarily contains hydrogen, and may be hydrogen. The oxidant gas may be oxygen, air, dry air, or the like. The separators may have a reactant gas channel on a face in contact with the gas diffusion layers. The separators may also have a coolant channel for maintaining a constant temperature of the fuel cell on a face opposite to the face in contact with the gas diffusion layers. The separators may be gas-impermeable electroconductive members or the like. Examples of the electroconductive members include dense carbon obtained by compressing carbon to obtain gas impermeability, a stamped metal (e.g., iron, aluminum, stainless steel, etc.) plate, and so forth. The separator may also have current collecting functions.

Manufacturing Method of Catalyst for Fuel Cell

A method for manufacturing the catalyst according to the present disclosure may include (1) supporting Pt or Pt and a metal M other than Pt on a carbon support, and when necessary, (2) alloying the Pt and the metal other than Pt (e.g., Co or the like) supported on the carbon support, and (3) acid-treating of the Pt or the Pt alloy supported on the carbon support. Examples of the metal M other than Pt include one type, or two or more types, of metal or the like selected from a group consisting of cobalt, nickel, iron, manganese, copper, titanium, tungsten, tin, gallium, zirconium, chromium, gadolinium, terbium, ytterbium, hafnium, and osnium.

In the supporting, the Pt or the metal M other than Pt are supported on the carbon support at a molar ratio of Pt:M=3:1 to 7:1, for example. Some of the metal M other than Pt is removed in the acid-treating described below, and accordingly, a greater amount of metal M other than Pt is supported in the supporting as compared to that in the molar ratio of Pt and the metal M other than Pt in the final catalyst product. Using the catalyst manufactured by adopting such a molar ratio enables the initial electric power generation performance of the fuel cell, and the durability performance of the fuel cell, to be further improved.

In the alloying, the Pt and the metal M other than Pt are alloyed at 700° C. to 900° C., or 750° C. to 850° C. Using the catalyst manufactured by adopting such alloying temperatures enables the initial electric power generation performance of the fuel cell, and the durability performance of the fuel cell, to be further improved.

In the acid-treating, the Pt or the Pt alloy supported on the carbon support is subjected to acid treatment at, for example, 70° C. to 90° C. or 75° C. to 85° C. By performing acid treatment at such temperatures, metals M other than Pt that do not contribute to the reaction can be sufficiently removed. Thus, elution of metals M other than Pt can be suppressed. Examples of acids used in the acid-treating include inorganic acids (nitric acid, phosphoric acid, permanganic acid, sulfuric acid, hydrochloric acid, and so forth) and organic acids (acetic acid, malonic acid, oxalic acid, formic acid, citric acid, lactic acid, and so forth).

The materials, products, features thereof, and so forth, in the method for manufacturing the catalyst according to the present disclosure have already been described in the Catalyst for Fuel Cell section. Matters explained in the above sections are to be appropriately referenced in this section.

The present disclosure will be described in further detail below by way of Examples and Comparative Examples, but the technical scope of the present disclosure is not limited thereto. Note that Examples and Comparative Examples are not distinguished by inclusion or non-inclusion in the Claims. Embodiments yielding particularly preferable results were taken as Examples, and other embodiments were taken as Comparative Examples.

Manufacturing of Electrode Catalyst

Manufacturing of the electrode catalyst according to Example 1 will be described. First, the supporting will be described. A carbon support having micropores (1.0 g, manufactured by Denka Company Limited) was dispersed in pure water (41.6 mL). A dinitrodiamine platinum nitric acid solution (Japanese Patent No. 4,315,857, manufactured by Cataler Corporation) containing platinum (1.0 g) was added dropwise, and allowed to sufficiently adapt to the carbon support. Ethanol (3.2 g) was added as a reductant, and platinum was supported on the carbon support by a reduction reaction. The disperse fluid was filtered and washed, and the resulting powder was dried, thereby obtaining a platinum-supporting carbon support. Next, the amount of oxygen on the surface of the platinum-supporting carbon support was reduced to 4% by weight or less, and cobalt (0.03 g) was supported by the platinum-supporting carbon support so that the product ratio (molar ratio) of Pt:Co was 7:1. The carbon support used in the present Example was acetylene black. Table 1 shows the results of measuring the BET specific surface area ($m^2$/g-carbon) and the micropore area ($m^2$/g-carbon), found by $N_2$ adsorption of the carbon support. Subsequently, in the alloying, the platinum-cobalt supporting carbon support was alloyed at 800° C. in an argon atmosphere, thereby obtaining a platinum-cobalt-alloy-supa cell temperature of 60° C. and a relative humidity at both electrodes of 80%. For I-V measurement, the current was optionally controlled in a range of 0.01 A/$cm^2$ to 4.0 A/$cm^2$. A voltage value at 0.2 A/$cm^2$ was defined as activated. Also, the gas diffusion limiting current value (A/$cm^2$) was measured as an average value of current observed between 0.1 V to 0.6 V in I-V measurement in the low current density region, under conditions of cell temperature of 45° C. and relative humidity at both electrodes of 165%. Table 1 shows the measurement results of Examples 1 to 6 and Comparative Examples 1 and 6.

TABLE 1

| Sample | Carbon support | | Corrosion test (1.2 V, 24 Hr, 80° C.) | | Electric power generating performance |
|---|---|---|---|---|---|
| | BET specific surface area ($m^2$/g-carbon) | Micropore area ($m^2$/g-carbon) | Absolute corrosion amount (wt %) | Specific corrosion rate (%) | Gas diffusion limiting current value (A/$cm^2$) |
| Comparative Example 1 | 110 | 28 | 5.3 | 64 | 0.115 |
| Comparative Example 2 | 262 | 41 | 9.7 | 49 | — |
| Comparative Example 3 | 337 | 42 | 9.1 | 37 | — |
| Comparative Example 4 | 466 | 65 | 17.8 | 51 | — |
| Comparative Example 5 | 541 | 74 | 16.6 | 41 | — |
| Comparative Example 6 | 457 | 33 | 19.2 | 56 | 0.180 |
| Example 1 | 316 | 67 | 7.5 | 32 | 0.178 |
| Example 2 | 250 | 48 | 6.4 | 34 | 0.162 |
| Example 3 | 281 | 67 | 7.0 | 33 | 0.165 |
| Example 4 | 338 | 73 | 8.0 | 31 | 0.175 |
| Example 5 | 303 | 63 | 7.3 | 32 | 0.175 |
| Example 6 | 335 | 74 | 7.9 | 31 | 0.180 | porting carbon support. In the acid-treating, the platinum-cobalt-alloy-supporting carbon support was acid-treated at 80° C., using 0.5 N nitric acid, thereby obtaining a catalyst.

For manufacturing of the electrode catalysts in Examples 2 to 6 and Comparative Examples 1 to 6, catalysts were manufactured in the same manner as in Example 1, except that carbon supports having specific surface areas and micropore areas shown in Table 1 were used.

Corrosion Test of Carbon Supports

The corrosion test was carried out under conditions of a single cell temperature of 80° C., a bubbler temperature of 80° C. (100% RH), and potential held at 1.2 V for 24 hours. The loss amount (absolute corrosion amount in units of wt %) and specific corrosion rate (%) of the carbon supports following the corrosion test were calculated. The results are shown in Table 1.

Evaluation of Electric Power Generating Performance

Figure 2:
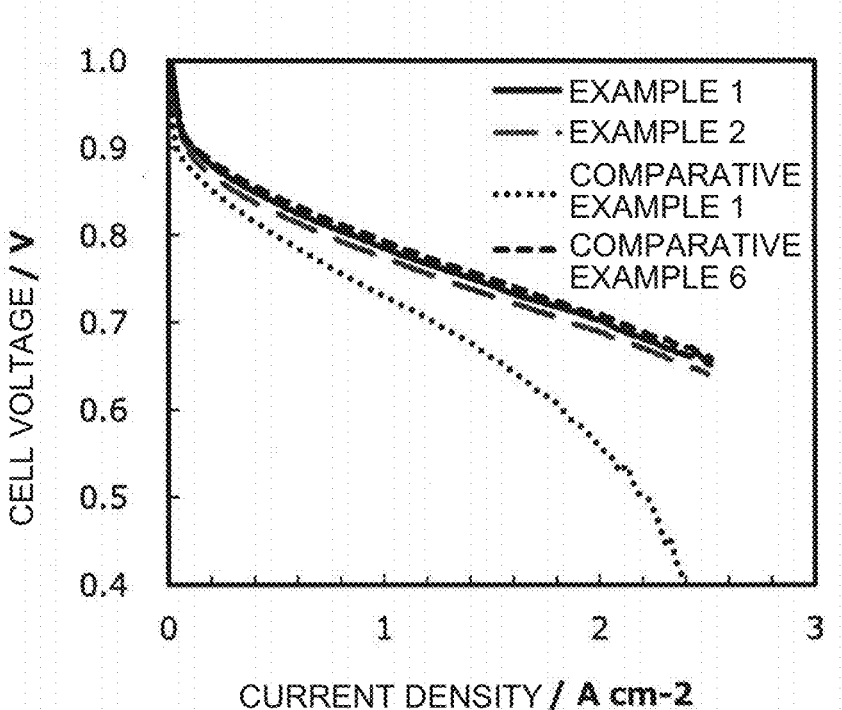
FIG. 2 is a graph showing a relation of cell voltage as to current density in a range of 0 A/cm² to 3.0 A/cm² in Examples 1 and 2, and in Comparative Examples 1 and 6.
Figure 3:
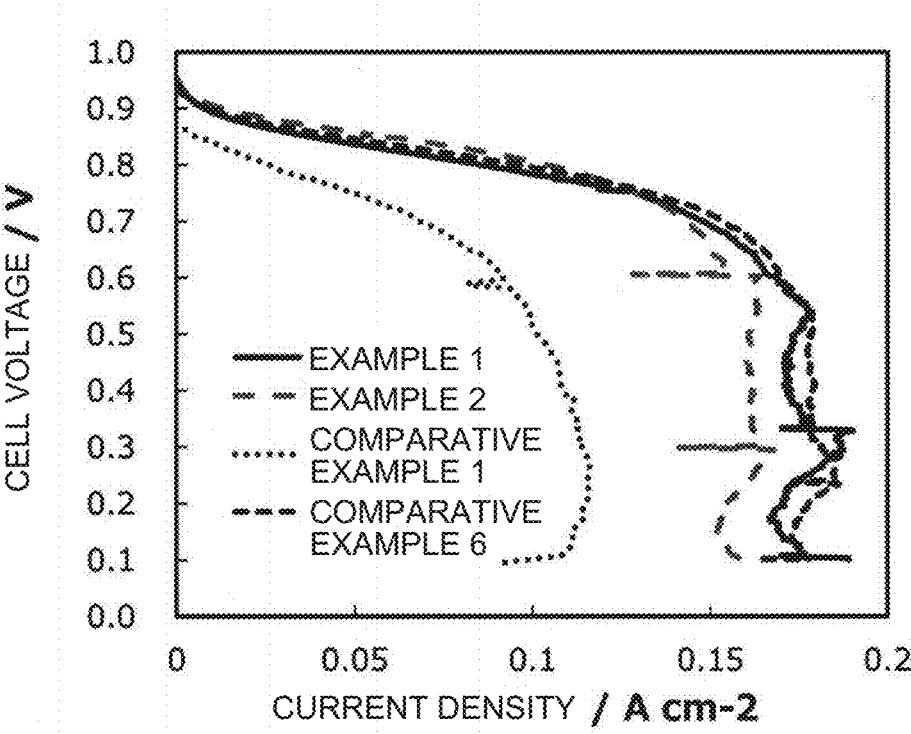
FIG. 3 is a graph showing a relation of cell voltage as to current density in a range of 0 A/cm² to 0.2 A/cm² in Examples 1 and 2, and in Comparative Examples 1 and 6.

The catalysts manufactured in each Example and each Comparative Example were dispersed in an organic solvent, and the disperse liquid was applied to a Teflon (registered trademark) sheet to form two electrodes. A polymer electrolyte membrane was sandwiched between two electrodes and hot-pressed, thereby obtaining a laminated membrane-electrode assembly. The membrane electrode assembly was sandwiched between two gas diffusion layers, thereby preparing a single cell for a polymer electrolyte fuel cell. I-V measurement was performed using a small single-cell evaluation device system (manufactured by Toyo Corporation) at FIG. 1 is a diagram showing a relation between specific surface area (SSA) and micropore area of carbon supports used in the Examples and the Comparative Examples. FIG. 2 is a graph showing a relation of cell voltage as to current density in a range of 0 A/$cm^2$ to 3.0 A/$cm^2$ in Examples 1 and 2, and in Comparative Examples 1 and 6. FIG. 3 is a graph showing a relation of cell voltage as to current density in a range of 0 A/$cm^2$ to 0.2 A/$cm^2$ in Examples 1 and 2, and in Comparative Examples 1 and 6. As shown in Table 1, Comparative Example 1 has a small absolute corrosion amount and thus has high durability, but has a low gas diffusion limiting current value and thus has low catalyst performance. Comparative Example 5 has low durability due to a large absolute corrosion amount. Comparative Example 6 has a high gas diffusion limiting current value and therefore has high catalyst performance, but has a large absolute corrosion amount and thus has low durability. Examples 1, 4, and 6 exhibit high durability due to the small absolute corrosion amount thereof, and exhibit high performance equivalent to that of Comparative Example 6 due to the high gas diffusion limiting current values thereof. Among Examples 1 to 6, Examples 2 and 3 exhibit relatively high durability because the absolute corrosion amount is relatively small, and exhibit the desired catalyst performance, although the catalyst performance is inferior to that of Examples 1, 4, and 6. From the above results, reducing the specific surface area of the carbon support reduces the degradation point of the carbon support, thereby improving the durability of the catalyst, and increasing the micropore area of the carbon support secures the desired gas diffusion, whereby deterioration of catalyst performance can be suppressed.

What is claimed is:

1. A catalyst for a fuel cell, the catalyst comprising:

a carbon support having a micropore; and a metal supported on the carbon support, wherein the metal is at least one of platinum and a platinum alloy, a specific surface area of the carbon support is 250 $m^2$/g-carbon or more and 338 $m^2$/g-carbon or less; and an area of the micropore of the carbon support is 48 $m^2$/g-carbon or more and 74 $m^2$/g-carbon or less; and wherein the carbon support has an absolute corrosion amount of 8.0 wt % or less.

2. The catalyst according to claim 1, wherein the carbon support is acetylene black.

3. The catalyst according to claim 1, wherein a gas diffusion limiting current value observed by I-V measurement of the fuel cell is 0.15 A/cm² or higher.

4. The catalyst according to claim 1, wherein the carbon support has an absolute corrosion amount of 6.4 wt % or more.

5. The catalyst according to claim 1, wherein the carbon support has an absolute corrosion amount of 7.0 wt % or more.

6. The catalyst according to claim 1, wherein the carbon support has an absolute corrosion amount of 7.5 wt % or more.

7. The catalyst according to claim 1, wherein the carbon support has an absolute corrosion amount of 7.9 wt % or more.

* * * * *